United States Patent [19]

Ferreira

[11] Patent Number: 5,410,153
[45] Date of Patent: * Apr. 25, 1995

[54] POSITION CALCULATION IN A SCINTILLATION CAMERA

[75] Inventor: Abel Ferreira, Pointe-Claire, Canada

[73] Assignee: Park Medical Systems, Inc., Lachine, Canada

[*] Notice: The portion of the term of this patent subsequent to Aug. 17, 2010 has been disclaimed.

[21] Appl. No.: 97,674

[22] Filed: Jul. 27, 1993

[51] Int. Cl.⁶ .............................................. G01T 1/208
[52] U.S. Cl. ........................ 250/363.09; 250/363.07; 250/252.1
[58] Field of Search ...................... 250/363.09, 363.07, 250/369, 252.1

[56] References Cited

U.S. PATENT DOCUMENTS

| | | |
|---|---|---|
| 3,900,731 | 8/1975 | Chevalier et al. |
| 4,079,257 | 3/1978 | Jatteau et al. |
| 4,228,515 | 10/1980 | Genna et al. |
| 4,272,677 | 6/1981 | Berthold et al. |
| 4,497,024 | 1/1985 | Roth |
| 5,516,025 | 5/1985 | Yamakawa et al. |
| 4,517,460 | 5/1985 | Meulenbrugge et al. |
| 4,583,187 | 4/1986 | Stoub |
| 4,593,198 | 6/1986 | Pang et al. |
| 4,603,256 | 7/1986 | Lelong |
| 4,605,856 | 8/1986 | Persyk et al. |
| 4,611,117 | 9/1986 | Seibert et al. |
| 4,629,894 | 12/1986 | Lelong |
| 4,634,863 | 3/1987 | Schwartz |
| 4,677,300 | 4/1987 | Tawil et al. |
| 4,780,823 | 10/1988 | Stoub et al. |
| 4,812,656 | 3/1989 | Yamakawa et al. |
| 4,860,205 | 9/1989 | Jatteau |
| 4,881,171 | 10/1989 | Jatteau et al. |
| 4,882,495 | 11/1989 | Tanaka |
| 4,882,680 | 11/1989 | Bonnefoy-Claudet et al. |
| 4,899,054 | 2/1990 | Barfod |
| 4,900,931 | 9/1990 | Tournier et al. |
| 4,942,291 | 11/1990 | Dietrich |
| 5,012,082 | 8/1991 | Watanabe |
| 5,013,919 | 10/1991 | Solomon |
| 5,187,357 | 3/1993 | Watanabe |
| 5,237,173 | 8/1993 | Stark et al. |

FOREIGN PATENT DOCUMENTS

| | | |
|---|---|---|
| 1280224 | 2/1991 | Canada |
| 0066763 | 12/1982 | European Pat. Off. |
| 0155463 | 9/1985 | European Pat. Off. |
| 0450388 | 6/1991 | European Pat. Off. |
| 0531566 | 6/1993 | European Pat. Off. |
| 2253274 | 1/1992 | United Kingdom |

OTHER PUBLICATIONS

"Theoretical and Experimental Investigations of the Distortion in Radiation Spectra Caused by Pulse Pileup" by Q. Bristow and R. G. Harrison; Nucl. Geophys. vol. 5 No. ½, pp. 141–186, May, 1991. Exeter, GB.

IEEE Transactions on Nuclear Science, vol. NS-31, No. 1, Feb. 1984; Title: A Fast Parallel Encoding Scheme for the Anger Camera. by P. A. Seeger, New York, USA.

IEEE Transactions on Nuclear Science, vol. NS-32, No. 1, Feb. 1985, Title: One- and Two-Dimensional Position Sensitive Scintillation Detectors for Thermal Neutrons; by R. Kurz, I. Naday, J. Schelten, New York, USA.

Primary Examiner—Paul M. Dzierzynski
Assistant Examiner—Richard Hanig
Attorney, Agent, or Firm—Ware, Fressola, Van Der Sluys & Adolphson

[57] ABSTRACT

For accurate position calculation of scintillation events in a gamma camera, improved methods are disclosed calibrating gain of photodetectors. The camera system may comprise an array of LEDs optically coupled to a scintillator crystal in which signals from photodetectors also coupled to the crystal are separated into those resulting from test LED pulses and actual gamma ray induced scintillations. The LED induced signals may be used for camera calibration while the camera is in image collecting mode. Image clarity may also be improved by correcting roughly calculated positions as a function of the roughly calculated positions, and by eliminating events which do not exactly correspond to nuclear decay emissions as a function of the events' positions.

18 Claims, 1 Drawing Sheet

POSITION CALCULATION IN A SCINTILLATION CAMERA

FIELD OF THE INVENTION

The present invention relates to position calculation for scintillation events in a scintillation camera. The invention relates further to a method for calibrating the gain of a scintillation camera, and to a method for correcting or producing a position value.

BACKGROUND OF THE INVENTION

Scintillation cameras are well known in the art, and are used for medical diagnostics. A patient ingests or is injected with a small quantity of a radioactive isotope whose decay emission photons are detected by a scintillation medium of the camera. The scintillation medium is commonly a thallium doped sodium iodide crystal which will emit a small flash or scintillation of light in response to stimulating radiation. The intensity of the scintillation is proportional to the energy of the stimulating photon. In order to produce the medical diagnostic image, scintillations having an energy which corresponds to the energy of the decay gamma photons of the radioactive isotope are detected by measuring the intensity of each scintillation in the crystal, and then calculating and recording the exact position of the scintillations based on the intensity values from at least three light detectors coupled to a surface of the scintillation medium and surrounding the point of scintillation.

Each light detector is a device which produces an electric signal proportional to the amount of light which enters its detector surface. If the electric gain of any light detector or photodetector is incorrectly adjusted or calibrated, an image distortion will result. Therefore, means must be provided to assure that all photodetectors are equally calibrated such that the same amount of light will result in the same amount of electric signal.

It is known in the art to carry out automatic amplification (gain) control of photodetectors using a pulsable light source, as described for example in European patent application publication No. 0,066,763. It is also known to use pulsable light sources for gain calibration in which the electric signals from the photodetectors are digitally converted in applicant's copending U.S. patent application Ser. No. 07/861,636.

In the known methods of gain calibration, the light source is pulsed long enough to produce an electrical signal which is comparable to an amount of light received during a valid scintillation. Therefore, gain calibration using the pulsable light sources cannot be carried out at the same time as the camera is placed in a radiation field and used for image recording.

Gain calibration is important to assure good position calculation, since in analog methods as in digital methods of position calculation, the accuracy is based on the relative accuracy of photodetector gain calibration. Two other factors affect position calculation (i.e. image quality), namely valid event discrimination and detector edge distortion.

In valid event discrimination, one analyzes the total amount of light received from a scintillation event and decides whether the event is the result of an emission from the isotope being imaged. If events of different energies are recorded erroneously as valid events, somewhat random image distortion results. Therefore, to maintain good image quality, prior art cameras attempt to restrict acceptance of events to only those whose 'energy' or total light generation is within strict tolerances. This results in some loss of valid events whose energy is detected to be outside of the tolerances, due to camera errors.

Edge distortion is the result of light detection losses when a scintillation occurs near a boundary between two or more light detectors. The edges of the detectors are usually less sensitive to light due to optical losses. In conventional cameras, some blurring and darkening of the image can be seen near detector boundaries due to edge distortion.

SUMMARY OF THE INVENTION

It is an object of the present invention to improve scintillation camera image quality by providing a method for calibrating the gain of a scintillation camera of the above-described type in which calibration of the camera can be carried out at the same time as the camera is used for image recordal.

It is another object of the present to improve scintillation camera image quality by providing a method of discriminating valid events using tolerances chosen as a function of the position of the event.

It is yet another object of the present to improve scintillation camera image quality by providing a method of producing a corrected position value of an event depending of the event's roughly calculated position, in order to account for edge losses and other detector sensitivity changes.

BRIEF DESCRIPTION OF THE DRAWINGS

The invention will be better understood by way of the following non-limiting detailed description of a preferred embodiment with reference to the drawings in which.

DETAILED DESCRIPTION OF THE PREFERRED EMBODIMENT

Figure 1:
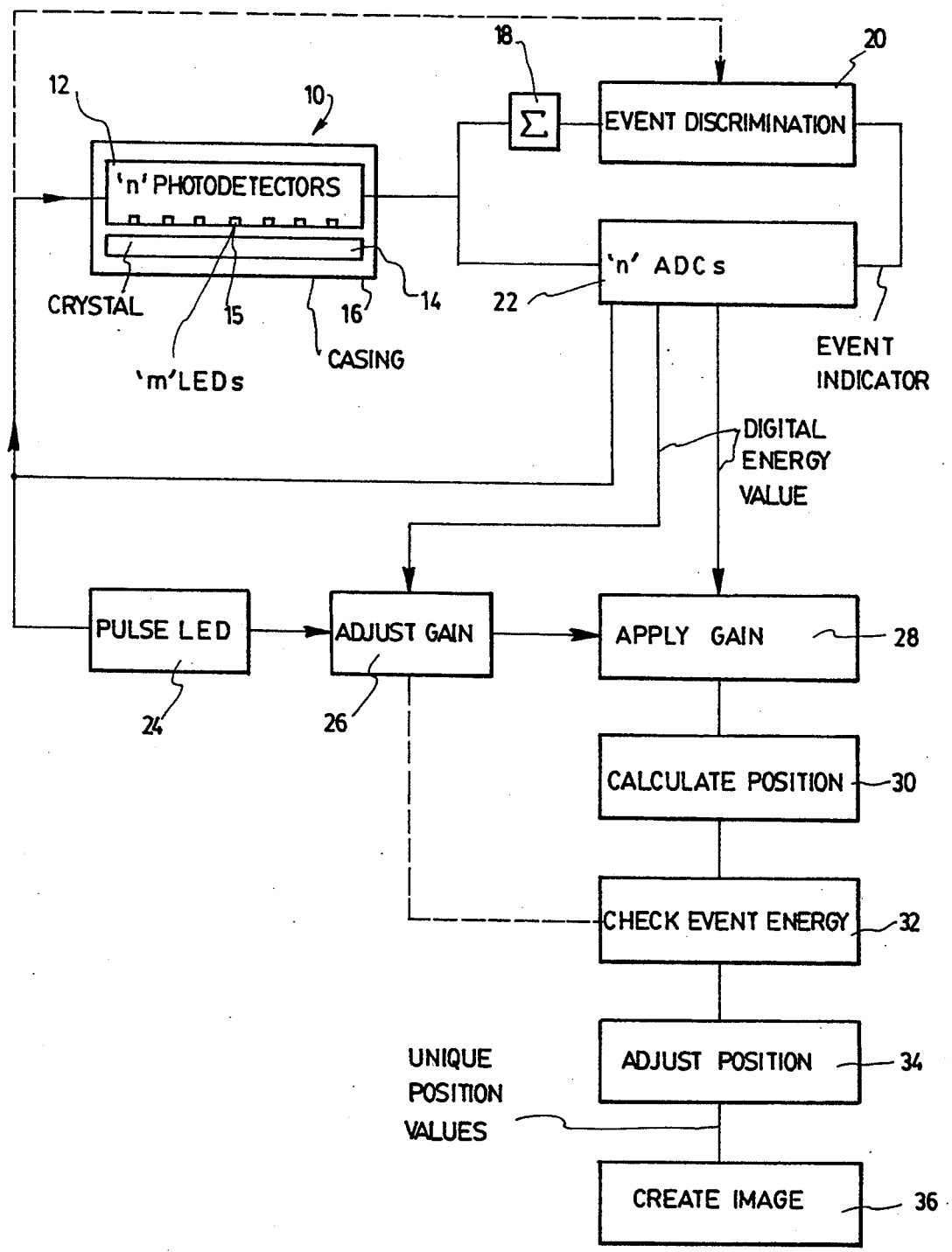
FIG. 1 is a block schematic diagram of a scintillation camera according to the preferred embodiment.

With reference to FIG. 1, the scintillation camera system comprises a camera (10) including an array of light detectors (12) optically coupled to a scintillator crystal (14), both of which are housed in a casing (16) having an entry window. An array of light emitting diodes (LEDs) (15) are arranged with the detectors (12) to produce light at specific points over the crystal (14) for calibrating the detectors (12).

The light intensity signals from the detectors (12) are summed by an adder unit (18) and the sum signal is fed to an event discrimination unit (20). Unit (20) analyzes the sum signal and produces an event indicator. Basically, if the sum signal falls within two values representing acceptable upper and lower limits for the signal created by a valid scintillation event, a positive event indication is given. The range of the limits can be changed when a different isotope is used, and in the case that two isotopes are used, two ranges can be used for accepting two different kinds of valid events.

In the preferred embodiment, the position calculation system is digital, and is based on calculating the center of event from at least three intensity signals. Therefore, a group of analog-to-digital converters (ADCs) (22) are provided which are individually connected to the detectors (12) for converting their analog signals into digital signals. Preferably, only those converters near an event center will convert, while the rest of the converters will remain ready. Furthermore, when an event is detected by detectors (12), alternating events are assigned an identifyer number (e.g. '1' or '2') which is fed to both the event discrimination unit (20) as well as the ADCs (22). If the unit (20) decides that one or more of the events are valid or not, the event indicator passes this information to the ADCs (22) and only those converters having signals from detectors (12) involved in valid events are triggered to convert, otherwise they are reset.

The digital energy values, or detector signals, are next fed to the gain adjustment unit (28). In the gain adjustment unit (28), a scaling factor is applied to compensate for any misadjustment in the analog gain of the light detectors (12). This scaling factor is different for each detector, and therefore the factor applied is a function of the detector number or position.

Once the gain is applied, a geometric calculation of the event center is carried out by the position calculator (30). In the preferred embodiment, three or more digital values (gain corrected) are used to determine the event center.

Next the event energy is checked once again (having first been checked by unit (20)) as a function of its position. The purpose of double checking the event energy is to compensate for detector losses or inefficiency over the entire crystal surface, and in particular at the junctions of the detectors (12) forming the array. Since the energy discrimination carried out by unit (20) was done based on the sum signal, without knowledge of the exact position of the event, more permissive lower limits were used in order to accept events occurring where the camera is less sensitive. Now, at unit (32), we have the knowledge of the event position and more accurate digital energy values. Therefore the event energy is recalculated by summing all detector signals involved and determining whether this energy falls within narrower limits which have been predetermined for the region in which the event is located. Each region in this case may be a few millimeters square. If the event falls outside the limits, it is discarded.

If the event is confirmed to lie within the narrower limits, another image quality enhancing step is carried out. A correction vector is added to the position value (which is also a coordinate vector) by position adjustment unit (34) based on the originally calculated position. The correction vector is predetermined empirically during initial calibration, and would be most significant for positions corresponding to the edges of the detectors (12). In a manner similar to unit (32), unit (34) may simply determine in which region (of a few millimeters square) the position value is located and apply the correction vector accordingly. Unit (34) may also involve using empirical formulae for determining the correction vector within larger regions.

The screened and adjusted position values are then fed to the image computer (36) for viewing, editing and storage.

Gain calibration or adjustment is carried out by unit (26), which may change the gain factors in unit (28). LED pulse unit (24) is connected to the LEDs (15) in camera (10) and to the gain adjust unit (26). Usually, a large number of LED pulses are carried out, and the resulting digital values resulting from the detectors surrounding the LED pulsed are compared to accepted values. If the value generated is too low or too high, on average, then the gain factor is adjusted to compensate for the change in the analog gain of the detector.

In the preferred embodiment, the LED pulse unit (24) has its output bus connected to LEDs (15) as well as ADC unit (22). Within unit (22), a convert trigger signal is given to those converters connected to detectors (12) which will receive light from the LED (15) pulsed. Unit (22) will also direct the digital values to the gain adjust unit (26) instead of unit (28) since these values will not be used for position data. Each LED (15) which can be pulsed will cause a group of ADCs to convert.

If another event (valid or noise) occurs near the LED pulsed, just before the LED pulsing, unit (22) will inform unit (26) that the ADCs in question are busy and to try again later. If the other event follows the LED pulsing, and the event indicator indicates a valid event, unit (22) notices that the events are in the same area and aborts the valid event conversion. If the other event and the LED event are coincident, unit (26) alone will receive the digital signal and ignore the event by noticing its total energy or greatly shifted center.

In the first alternative embodiment, when an LED (15) is pulsed, the event discriminator receives the LED trigger pulse as well and prepares itself to receive an event having an energy corresponding to the pulse. The event discriminator estimates the LED event energy itself based on the pulse duration, or unit (20) can be preprogrammed to accept as an LED event a given energy range corresponding to the LED events, either at all times or only when a pulse is generated by unit (24). When the event indicator indicates that the event is an LED event, unit (22) switches its output of digital values to unit (26) instead of unit (28).

In the second alternative embodiment, no connection between unit (24) and unit (20) is provided, and events of either a predetermined energy other than the valid event energy are automatically fed from the ADCs (22) to the gain adjust unit (26) as a result of the event indicator's direction. The gain adjust unit (26) then confirms that the location of the event is near where the pulsed LED (15) is located, before gain adjustment is carried out.

In a third alternative embodiment, the operation is simplified, and unit (24) is connected to unit (20). Irrespective of event energy and position, the event discrimination will indicate that the event is an LED event provided that no other event coincides with the LED pulse. The event indicator flags the event as an LED event, and the digital values are fed to the gain adjust unit (26) for processing.

In a fourth alternative embodiment, the LED pulse is made short enough to be below a minimum energy threshold for the entry window of the camera (10). In this case, the event discriminator (20) detects the low energy and knows that this can only be the result of an LED pulse and not any valid or background event. The event indicator is set to indicate an LED event, and the LED pulse unit (24) need not communicate the location data to unit (22) for the purposes of confirming that the event was an LED event.

In a fifth alternative embodiment, a large number of pulses are generated using one LED (15), and any non-valid (isotope) event values are fed to the gain adjust unit (26), where the average of the detector values is calculated while excluding the values of those events whose calculated position differs from the expected value of the calculated position by more than a predetermined amount. Preferably, this method operates by changing at least one of the limits in the event discrimination in unit (20), and when pulsed events falling within the expanded limit (but not within the valid range) are excluded by unit (32), the position value of the event is fed to unit (26) from unit (32). In this case unit (24) is not connected to unit (20), and units (26) and (28) share the same digital value input line.

In a sixth alternative embodiment, the camera (10) includes analog comparators connected in a network between the detectors (12) in such a way that the signal from each detector (12) is compared to a threshold and to the signal of each of its neighbor's signals. If a detector has a signal greater than the threshold and all of its neighbors' signals, it is an event center detector, and a corresponding event center signal is generated by the network. Such a network can be used when either digital or analog position calculation is used. The event center is then compared to the position of the LED (15) pulsed by unit (24). If the event center and the LED position are adjacent, then the event is identified as an LED event, and the digital values are fed to unit (26). The comparison of the event center with the LED position can be carried out either in unit (20) or unit (22) as desired.

Although the preferred embodiment illustrates a purely digital camera (10), it is to be understood that the above described methods and units can be easily adapted to operate when analog position calculation is used.

As can be appreciated, many variations are possible within the scope of the present invention. Combinations of various embodiments is also possible and may be advantageous depending on the exact requirements of the camera desired.

What is claimed is:

1. A method of light detector gain calibration for a scintillation camera having a scintillator, light detectors optically coupled to said scintillator for producing light detector signals and a plurality of light sources in optical contact with said light detectors in said camera, the method comprising the steps of:
    a) pulsing one of said light sources;
    b) reading a predetermined subset of said intensity signals, said subset representing a reduced set of signals produced by ones of said detectors surrounding said one light source pulsed;
    c) comparing said signals read in the previous step to an expected value; and
    d) adjusting, if necessary, a gain of at least one of said light detectors near said one light source pulsed as a function of the comparing in the previous step.

2. Method as claimed in claim 1, wherein said gain adjusting is carried out, if necessary, based on an average function of a large number of carrying out of said steps a), b) and c).

3. Method as claimed in claim 1, further comprising a step after step b) of:
    calculating a position of an event center from said signals read, and ignoring said signals read if said event center is located at a distance from an expected event center which is greater than a predetermined amount.

4. A method of light detector gain calibration for a scintillation camera having a scintillator, light detectors coupled to said scintillator, an entry window and a plurality of light sources in optical contact with said light detectors in said camera, the method comprising the steps of:
    a) pulsing one of said light sources with a given duration to generate signals from said light detectors less than signals generated when a photon of marginally sufficient energy to penetrate said window interacts with said scintillator;
    b) reading said signals generated from said light detectors when said one light source is pulsed;
    c) comparing said signals read in the previous step to an expected value; and
    d) adjusting, if necessary, a gain of at least one of said light detectors near said one light source pulsed as a function of the comparing in the previous step.

5. Method as claimed in claim 4, wherein said gain adjusting is carried out, if necessary, based on an average function of a large number of carrying out of said steps a), b) and c).

6. Method as claimed in claim 4, further comprising a step after step b) of:
    calculating a position of an event center from said signals read, and ignoring said signals read if said event center is located at a distance from an expected event center which is greater than a predetermined amount.

7. A method of light detector gain calibration for a scintillation camera having a scintillator, light detectors optically coupled to said scintillator for producing light detector signals and a plurality of light sources in optical contact with said light detectors in said camera, the method comprising the steps of:
    a) producing a sum signal from said light detector signals;
    b) pulsing one of said light sources for a given duration to generate said sum signal having a value substantially distinct from a value of said sum signal generated when a photon emitted from a predetermined radioactive isotope interacts with said scintillator;
    c) determining from said sum signal whether said light detector signals represent a result of said pulsing or said photon interacting with said scintillator;
    d) comparing at least one of said intensity signals to an expected value; and
    e) adjusting, if necessary, a gain of at least one of said light detectors near said one light source pulsed as a function of the comparing provided that it is determined in step (c) that said light detector signals represent a result of said pulsing.

8. Method as claimed in claim 7, wherein said gain adjusting is carried out, if necessary, based on an average function of a large number of carrying out of said steps a), b), c), and d).

9. Method as claimed in claim 7, further comprising a step after step c) of:
    calculating a position of an event center from said signals read, and ignoring said signals read if said event center is located at a distance from an expected event center which is greater than a predetermined amount.

10. A method of light detector gain calibration for a scintillation camera having a scintillator, light detectors optically coupled to said scintillator for producing light detector signals and a plurality of light sources in optical contact with said light detectors in said camera, the method comprising the steps of:
    a) comparing said light detector signals of each said light detector to said light detector signals of ones of said light detectors surrounding said each said light detector and to a threshold value to produce an event center signal;

b) pulsing one of said light sources;

c) determining whether said event center signal originates from one of said light detectors near said one of said light sources pulsed;

d) comparing at least one of said light detector signals to an expected value; and e) adjusting, if necessary, a gain of at least one of said light detectors near said one light source pulsed as a function of the comparing provided that it is determined in step (c) that said event center signal originates from one of said light detectors near said one of said light sources pulsed.

11. Method as claimed in claim 10, wherein said gain adjusting is carried out, if necessary, based on an average function of a large number of carrying out of said steps a), b), c), and d).

12. Method as claimed in claim 10, further comprising a step after step c) of:

calculating a position of an event center from said signals read, and ignoring said signals read if said event center is located at a distance from an expected event center which is greater than a predetermined amount.

13. A method of light detector gain calibration for a scintillation camera having a scintillator, light detectors optically coupled to said scintillator for producing light detector signals and a plurality of light sources in optical contact with said light detectors in said camera, the method comprising the steps of:

a) pulsing one of said light sources within a given time frame;

b) producing a sum signal from said light detector signals;

c) analyzing said sum signal during said time frame to determine whether a scintillation event also occurred within said time frame;

d) comparing at least one of said light detector signals to an expected value; and e) adjusting, if necessary, a gain of at least one of said light detectors as a function of the comparing provided that it is determined in step (c) that no scintillation event occured within said time frame.

14. Method as claimed in claim 13, wherein said gain adjusting is carried out, if necessary, based on an average function of a large number of carrying out of said steps a), b), c), and d).

15. Method as claimed in claim 13, further comprising a step after step c) of:

calculating a position of an event center from said signals read, and ignoring said signals read if said event center is located at a distance from an expected event center which is greater than a predetermined amount.

16. A method of light detector gain calibration for a scintillation camera having a scintillator, light detectors optically coupled to said scintillator for producing light detector signals and a plurality of light sources in optical contact with said light detectors in said camera, the method comprising the steps of:

a) pulsing one of said light sources a plurality of times in rapid succession over a short time period;

b) determining a position value of each light event based on said light detector signals;

c) comparing at least one of said light detector signals from each light event to an expected value; and d) adjusting, if necessary, a gain of at least one of said light detectors as a function of an average of the comparing for those light events in which said position value does not deviate from an expected position value by more than a predetermined distance.

17. A method of producing a position value signal in a scintillation camera having a scintillator, light detectors optically coupled to said scintillator for producing light detector signals, the method comprising the steps of:

a) producing a sum signal of said light detector signals;

b) determining whether a strength of said sum signal falls within rough upper and lower limits, and if so, carrying out the following steps;

c) calculating an event position based on said light detector signals;

d) determining whether said strength falls within finer upper and lower limits established for said event position, and if so, transmitting said event position as said position value signal produced.

18. Method as claimed in claim 17, further comprising a step of adding a position adjustment vector to said event position as a function of said event position to produce a sum and transmitting said sum as said corrected position value signal produced.

* * * * *

UNITED STATES PATENT AND TRADEMARK OFFICE
CERTIFICATE OF CORRECTION

PATENT NO. : 5,410,153
DATED : April 25, 1995
INVENTOR(S) : Abel Ferreira

It is certified that error appears in the above-indentified patent and that said Letters Patent is hereby corrected as shown below:

On the title page:Item [56], line 8, please change "5,516,025" to --4,516,025--.

Signed and Sealed this

Twenty-ninth Day of August, 1995

Attest:

BRUCE LEHMAN

*Attesting Officer*  *Commissioner of Patents and Trademarks*